J. F. BLACK.
Harvester-Droppers

No. 148,169.  Patented March 3, 1874.

WITNESSES  
J. P. Connolly  
T. P. Nolan

INVENTOR  
Joseph F. Black  
By Connolly Bros  
Attorneys.

UNITED STATES PATENT OFFICE.

JOSEPH F. BLACK, OF LANCASTER, ILLINOIS.

IMPROVEMENT IN HARVESTER-DROPPERS.

Specification forming part of Letters Patent No. 148,169, dated March 3, 1874; application filed December 1, 1873.

*To all whom it may concern:*

Be it known that I, JOSEPH F. BLACK, of Lancaster, in the county of Cass and State of Illinois, have invented certain new and useful Improvements in Harvesters; and I do hereby declare the following to be a full, clear, and exact description of the invention, such as will enable others skilled in the art to which it pertains to make and use it, reference being had to the accompanying drawings, which form part of this specification, in which—

Figure 1:
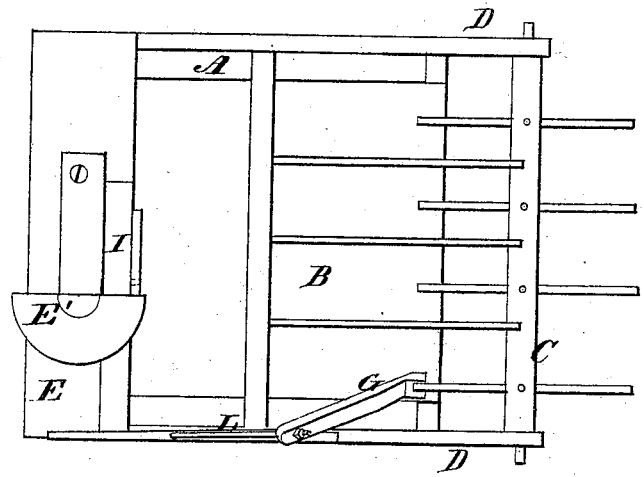
Figure 2:
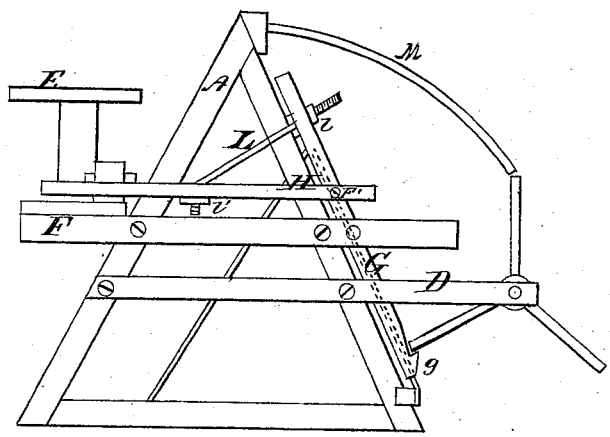

Figure 1 is a plan view of my improvement. Fig. 2 is a side elevation of the same.

This invention has relation to grain-droppers for harvesting-machines; and it consists in the combination and arrangement of the grain supporting and dropping reel, and the adjustable devices, whereby the movement of the reel is brought under the control of the driver, all as hereinafter described.

Referring to the accompanying drawing, A designates a triangular frame forming part of a harvesting-machine, and designed especially for supporting the grain dropping-devices and inclined grain-board B. C designates the reel, by which the grain is received from the grain-board upon its rows of arms successively. The reel is arranged in a horizontal position, at right angles with the finger-bar, and is supported at a slight distance from the grain-board by the horizontal arms D, attached to the front and rear portions of the frame A. E designates the foot-board, holding the driver's seat E′, and supported upon the ends of the horizontal bars F, secured to the frame A. G designates a bar pivoted to one of the bars F, and inclined toward the reel. The lower end of the bar G is provided with a shoulder, $g$, upon which rests one of the arms of the reel when the latter is in a position to receive grain. Above the bar F, to which the bar G is pivoted, the latter is secured by means of a screw, F′, to an arm, H, which extends laterally to and over the foot-board behind the driver's seat, where it rests upon the end of a foot-lever, I, pivoted to the foot-board in such a position that its forward end is accessible to the driver's foot. When the reel has received sufficient grain to form a sheaf, the driver, by pressing down the forward end of the lever I, elevates the adjacent end of the bar H, and releases the shoulder $g$ from the reel, allowing the latter to turn sufficiently to drop the grain from one row of teeth and bring the next in position for the reception of another. The grain to form the sheaves are delivered to the reel over the inclined grain-board B, which is arranged, with reference to the frame of the machine, as clearly shown in Fig. 2. L designates an oblique rod, threaded on one or both ends, to receive a nut or nuts, $l\ l'$, and secured to the bars G H. Through the medium of this rod and the nut $l$, the bar G may be adjusted to an exact position for the support upon its shouldered end of the reel-arms, when the latter are brought into proper position for the reception of the grain. M designates curved fingers projecting over the center of the reel, and so arranged as to relieve the reel-arms of any grain that may remain on them as the reel turns toward the grain-board.

What I claim as new, and desire to secure by Letters Patent, is—

The inclined lever G, having the foot $g$, horizontal arm H, and treadle I, in combination with the dropper-reel C, all constructed and arranged as shown, and for the purpose specified.

In testimony that I claim the foregoing I have hereunto set my hand this 16th day of October, 1873.

JOSEPH F. BLACK.

Witnesses:
JOHN MATHIS,
FRANK DYER.